May 29, 1934.  L. F. YENDER  1,960,836

PORTABLE MILL

Filed Aug. 3, 1931

Inventor

Lawrence F. Yender by Orwig & Hague Attys.

Patented May 29, 1934

1,960,836

UNITED STATES PATENT OFFICE 1,960,836

PORTABLE MILL

Lawrence F. Yender, Carroll, Iowa

Application August 3, 1931, Serial No. 554,767

2 Claims. (Cl. 83—11)

This invention relates to improvements in portable mills of that type now in commercial use, which are designed to be moved from one farm to another for grinding the feed. In this type of mill a pivoted cover is employed, having in one of its sides a feed opening through which the material being ground is delivered to the grinding element. In this type of mechanism the mill proper is supported on the frame of a portable truck so that the feed opening is comparatively high, requiring a considerable amount of manual labor to deliver the material therein. Furthermore it is necessary that the cover be swung to an open position for changing the screens in the bottom of the mill. This cover member is usually quite heavy and a considerable amount of energy is necessary to operate the same. In view of the fact that the screens have to be changed three or four times in a single job on a small farm, it will be seen that the labor necessary to handle the cover is more or less objectionable.

The object of my invention is to provide in a portable mill having a swinging top and feed opening, an improved conveyor or feeder for elevating material from a point near the ground surface to the feed opening of the mill, and in connection therewith improved means whereby the free end of the feeder may be utilized to assist in swinging the pivoted cover to an open position.

More specifically it is the object of my invention to provide in a mill of that type having a pivoted cover member having a feed opening in one side, a feeder comprising a trough having one end pivoted in the feed opening and the opposite end supported on or near the ground surface when in operative position, whereby material may be easily delivered from a point near the ground surface into said feed opening, and further to provide in connection therewith, means for supporting the free end of the feeder in an elevated position, whereby when so supported downward pressure on the free end of the feeder will cause the cover to be swung to open position.

My invention consists in the construction, arrangement and combination of the various parts of the device, whereby the objects contemplated are attained, as hereinafter more fully set forth, pointed out in my claims, and illustrated in the accompanying drawing, in which:

Figure 5:
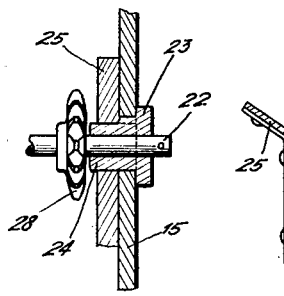
Figure 5 is a detail sectional view, taken on the line 5—5 of Figure 2.
Figure 4:
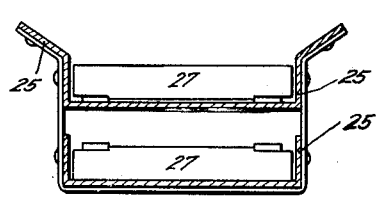
Figure 4 is a detail sectional view, taken on the line 4—4 of Figure 2.
Figure 3:
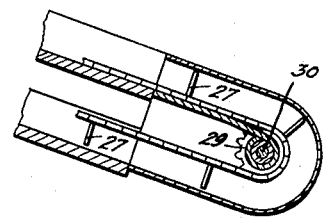
Figure 3 is a detail sectional view, taken on the line 3—3 of Figure 1.
Figure 2:
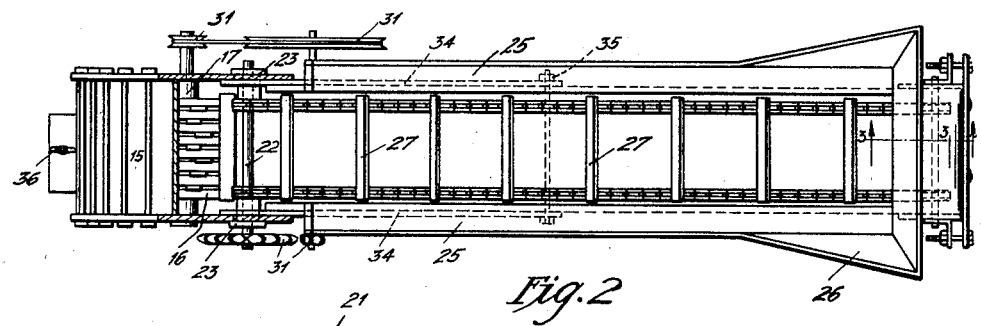
Figure 2 is a sectional view, taken on the line 2—2 of Figure 1.

Referring to the accompanying drawing, I have used the reference numeral 10 to indicate the frame of a truck or similar portable device, which is supported by wheels 11. Secured to the frame 10 are cross members 12, on which the mill 13 is mounted, the mill comprising a base section 14 and a cover section 15, the base section being formed hollow and semi-cylindrical for receiving the grinding element 16, said element being carried by a shaft 17, mounted in suitable bearings in the member 14. A screen 18, which is of ordinary construction, is provided.

The cover 15 is pivotally secured to the upper edge of the back side of the member 14 by means of a pivot member 19. A curved plate 20 is provided to serve as a back for the upper half of the grinding element 16, said plate 20 being attached to the side members of the cover 15 so that a feed opening 21 is provided.

Figure 1:
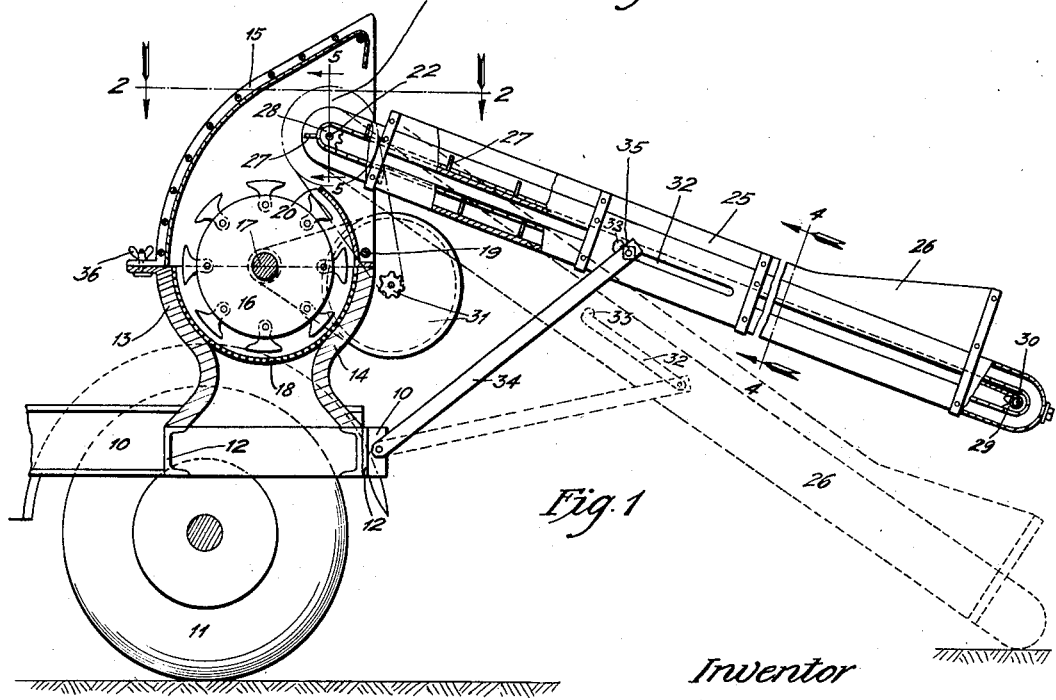
Figure 1 is a side elevation of my portable mill, the mill and a portion of the conveyor being broken away.

Rotatively mounted in the side members of the cover 15 is a shaft 22 supported in bearings 23, said bearings being anchored to the side members against rotation, said bearing members having inwardly extending portions 24 which serve as pivots for the side members 25 of the conveyor trough 26. The lower end of the trough 26 is designed to rest normally on the ground surface when the feed is being elevated to the mill, as shown by dotted lines in Figure 1.

The trough 26 is provided with an endless conveyor 27 designed to operate over sprockets 28 carried by the shaft 22, and sprockets 29 carried by a shaft 30 in the free end of the trough. The shaft 22 is driven by means of suitable speed reducing gear mechanism 31, which may be of any desired construction, and operated from the shaft 17.

Each of the side members 25 is provided with a slot 32, the upper end of each of the slots 32 having a notch 33.

Pivotally mounted in the back end of the frame member 12 is a pair of braces 34, the free end of each of the braces having a bolt 35 for entering the slot 32. The bolts 35 are designed to rest in the lower ends of the slots 32 when the conveyor trough is in operative position, as illustrated in dotted lines.

When it is desired to swing the top of the cover member 15 rearwardly, the free end of the trough 26 is elevated, permitting the bolts 35 to be moved forwardly until they enter the notches 35, after which downward pressure on the free end of the conveyor trough will cause the cover member 15 to be swung to an open position. The movable ends of the links 34 serve to act as fulcrums and to swing downwardly and rearwardly to permit opening movement of the cover, thereby providing means whereby the weight of the free end of the conveyor may be utilized to assist in somewhat counterbalancing the weight of the cover, and at the same time provide a leverage device for swinging the cover to an open position.

The delivery end of the conveyor 27 is so located as to deliver the material through the opening 21 in operative relation with the grinding element 16.

Thus it will be seen that I have provided in connection with a portable feed mill of that type having a comparatively heavy swinging upper half section or cover, an improved feeding conveyor so mounted that material may be first delivered to the conveyor, which will be automatically elevated to the grinder, and means for bracing the free end of the conveyor in an elevated position, whereby the free end may serve as a lever to open the cover member. The braces 34 also serve to support the free end of the conveyor while being transported.

A suitable latch device 36 is provided for locking the cover in its closed position.

I claim as my invention:

1. A portable mill comprising a movable frame, a mill supported thereon having lower and upper sections, the upper section being pivotally mounted to the lower section and having a feed opening, an endless conveyor having one end pivotally mounted on said feed opening, a brace having one end pivoted to said frame at a point remote from the pivot center of said cover, said conveyor having a longitudinal slot provided with an offset notch at its inner end, a pin in the free end of said brace mounted to travel in said slot as the free end of said conveyor is elevated and lowered and to enter said notch when elevated to serve as a fulcrum whereby the free end of the trough may be utilized to swing the cover member to an open position.

2. In a device of the class described, the combination of a mill comprising upper and lower sections, a screen in the lower section, a grinding element supported above said screen, means for pivoting the upper section to the lower section, said upper section having a feed opening, bearing members carried by the sides of said upper section, said bearing having inwardly projecting portions, a conveyor trough pivotally mounted on said inwardly projecting portions, a conveyor shaft rotatively mounted in said bearing members, sprockets carried by said shafts, a conveyor for said trough operated by said sprockets, brace members for supporting the free end of said trough in an elevated position, whereby the free end of the brace may be used as a fulcrum and the trough as a lever for swinging the upper section of said mill to an open position to permit said screen to be removed, and means for latching said cover member in a closed position.

LAWRENCE F. YENDER.